Patented June 11, 1929.

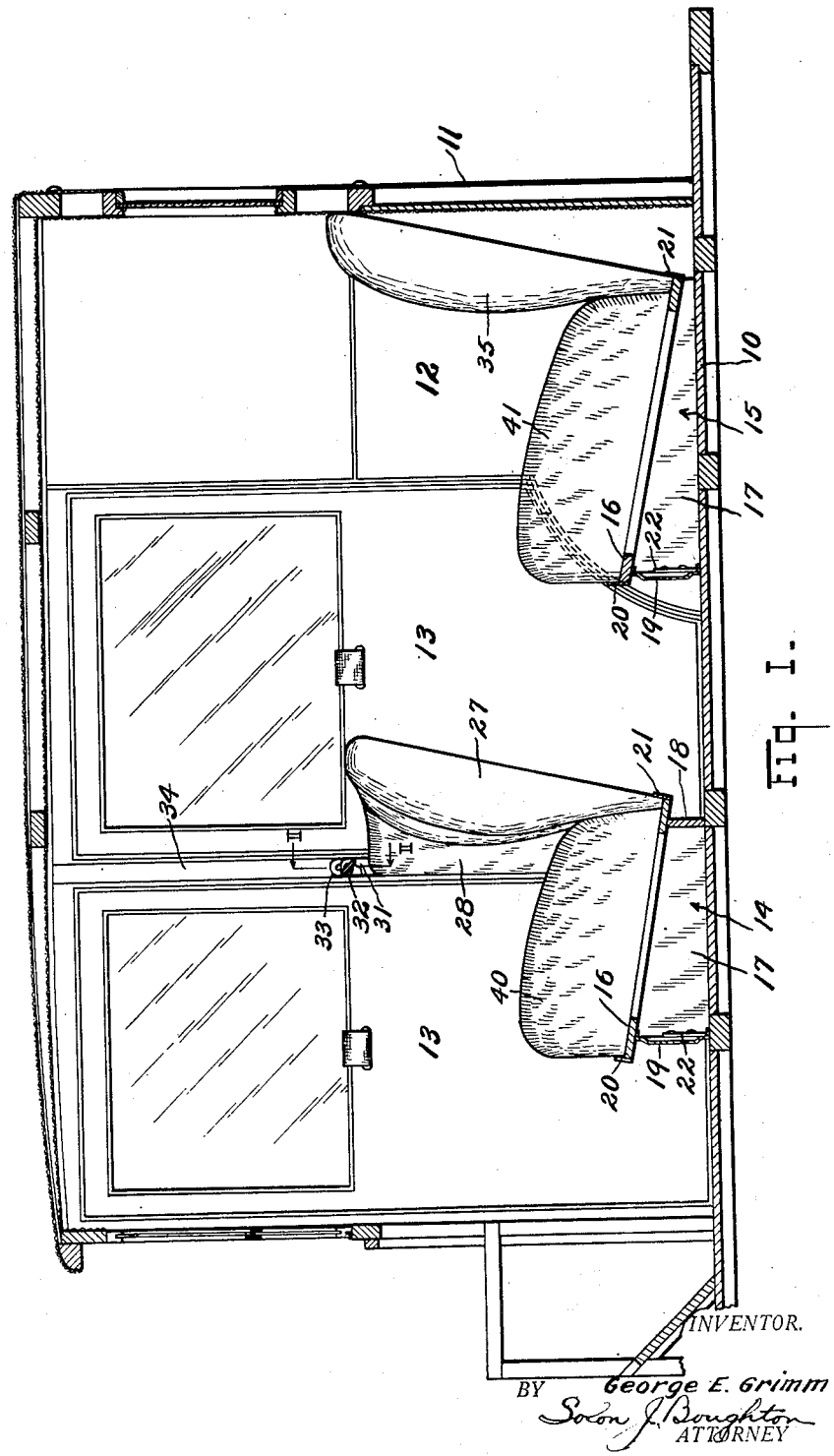

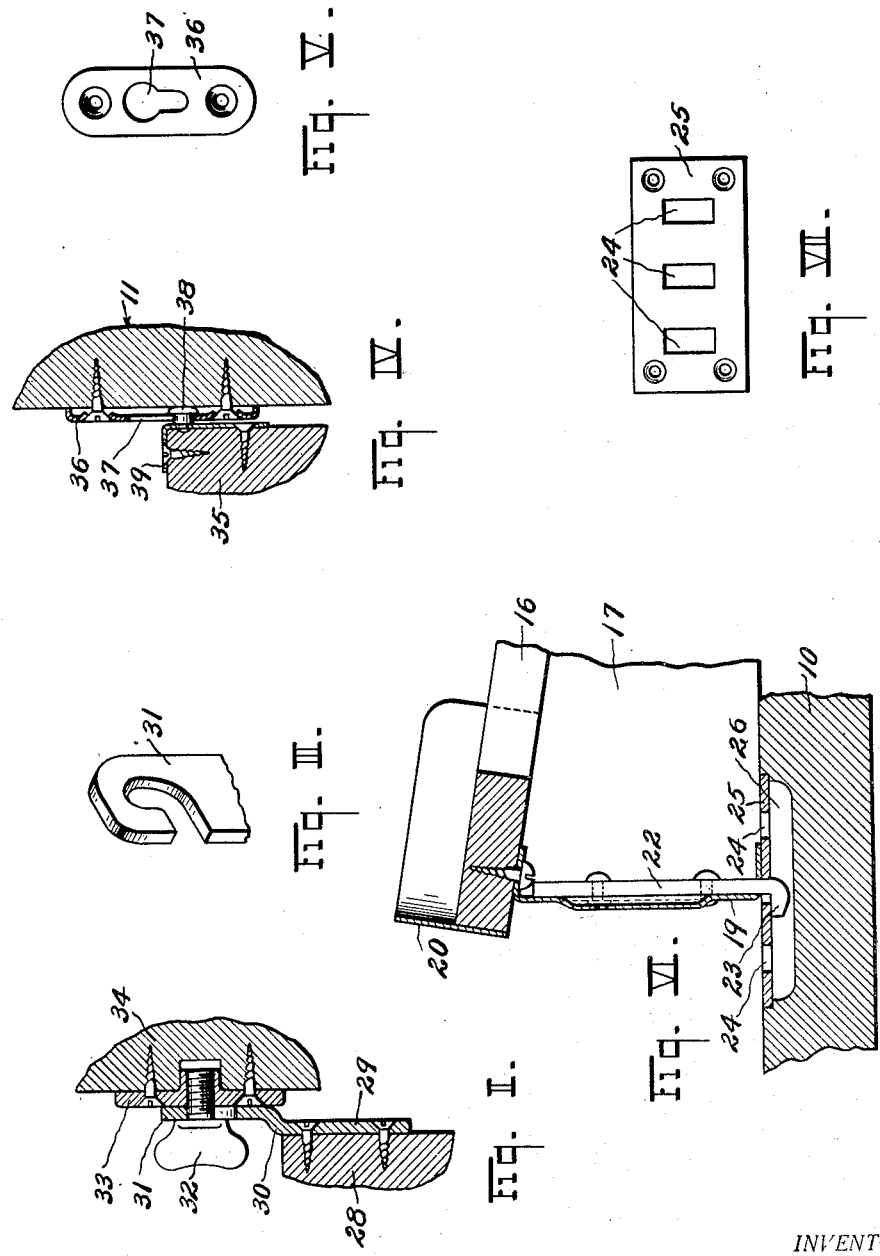

1,717,336

UNITED STATES PATENT OFFICE.

GEORGE E. GRIMM, OF TOLEDO, OHIO, ASSIGNOR TO THE WILLYS-OVERLAND COMPANY, OF TOLEDO, OHIO, A CORPORATION OF OHIO.

BODY FOR AUTOMOTIVE VEHICLES.

Application filed April 18, 1923. Serial No. 632,991.

This invention relates to improvements in bodies for automotive vehicles, and is designed to render a body adaptable for use in several different ways.

One of the objects of the invention is the provision of a body primarily useful as a sedan or coach, but secondarily useful either for the conveyance of merchandise, or as a camping car.

Another object of the invention is the provision of complete seats, so mounted as to be rigidly fixed in place against accidental movement, but capable of quick and ready disassembly and removal.

A further object is the provision of means for adjusting a seat stool longitudinally of the automobile body, and for swinging the seat back correspondingly, so as to enable the user to regulate foot room and inclination of back support to suit his particular requirements.

Still another object is to make the rear seat completely removable. In order to provide a compartment for the storage of articles to be transported, and to make both seats removable in order to leave the body of the car entirely unobstructed, thus permitting the user to spread a mattress upon the floor and utilize the car for a sleeping compartment during camping trips and the like.

Other objects, and objects relating to details of construction and economies of manufacture, will appear as I proceed with the description of that embodiment of the invention which, for the purposes of the present application, I have illustrated in the accompanying drawings, in which:

Figure I is a view partly in longitudinal section, of an automobile body embodying my invention.

Fig. II is a vertical, sectional, detail view, taken substantially on the line II—II, Fig. I, showing a connection which may be employed between the side wall of the car and the seat back.

Fig. III is a fragmental, perspective, detail view of a hook forming part of the seat connection.

Fig. IV is a vertical, sectional view, showing a connection which may be employed between the rear wall of the body and the back support for the rear seat.

Fig. V is an elevational view of that portion of the last-named connection which is to be secured to the body wall.

Fig. VI is a fragmental, sectional view through the forward part of one of the stools and an adjacent portion of the floor, showing means for adjustably securing the stool in various positions longitudinally of the car, and Fig. VII is a plan view of one of the plates employed in the floor of the car in the present embodiment, for co-operating with a hook on the stool to hold the latter in its several positions of adjustment.

Similar reference characters refer to like parts throughout the views.

In the drawings I have shown somewhat diagrammatically, a closed automobile body of the sedan or coach type, 10 being the floor, 11 the rear wall, 12 a side wall, and 13 a door. The floor is preferably flat and the side walls are also preferably straight. The seats are so designed and mounted that they may be completely removed so as to leave the floor and side walls entirely unobstructed, thus making it possible to readily utilize the automobile body as a sleeping compartment, the floor of the car constituting the bed. I employ seat stools 14 and 15, of a type quite similar to those conventionally used. The stools 14 and 15 may be identical, although I prefer to have the rear stool 15 somewhat deeper than the forward one. The stool may be constructed of an upper inclined wood frame 16 to the bottom surface of which are secured wooden side walls 17 and rear wall 18, and a front metallic wall 19. Across the front of each frame 16, I mount an upstanding metal fence 20, and at the rear of the frame, a similar fence 21.

A pair of vertical steel bars 22 are riveted or otherwise fastened to the front wall 19 of the stool at transversely spaced positions. Each of these bars terminates at its lower end in a hook 23 which is adapted to engage in any one of three slots 24 in one of a pair of plates 25 mounted in the floor 10, so as to be flush with the top surface of the latter. The floor is undercut at 26 beneath the plates 25 in order to provide space for the hooks 23. No other fastenings are used for the seat stools. It will be obvious that the hooks may be engaged with the slots 24 by inserting the hooks when the rear of the seat is tilted upwardly, and that when the stool is thereafter swung downwardly, the hooks will move into the position illustrated in Fig. VI.

The back support for the forward seat consists of a rear section 27 and side quarters 28 built as a unitary structure. Preferably this structure consists of a metal rear wall with a continuous cushion attached to the front surface thereof. The lower edge of the back support is adapted to rest upon the frame 16 of the stool, against the forward surface of the fence 21. At the top forward edge of each side quarter 28, I preferably mount an upwardly extending metal strip 29 having an offset 30 therein, and terminating in a hook portion 31. These hooks 31 are adapted to be dropped over the shanks of winged bolts 32 threaded into plates 33 which are secured by means of screws or otherwise to a pillar 34 or other portion of the body side wall. When the seat back is removed from the car, the bolts 32 may be permitted to remain in the threaded plates 33, or they may be entirely removed in case it is desired to leave the walls of the car absolutely unobstructed.

While it is obvious that the back support 35 for the rear seat might be of a form similar to that just described, I prefer to eliminate the side quarters and to secure the back support to the rear wall 11 of the body, rather than to the side walls. In Figs. IV and V there is illustrated a form of fastening which may be employed for this purpose. It consists of a plate 36 containing a key-slot 37, this plate being secured to the rear wall of the car by screws or otherwise, and being formed at its periphery with a rearwardly extending flange adapted to hold the body of the plate away from the car wall. 38 is a headed projection secured to the back support by any desired means. In the present instance, it is illustrated as riveted to an angle plate 39 screwed to the upper edge of the back support. Two or more of these fastenings are employed. The headed projections 38 are thrust into the round portions of the slot 37, and the back support is then permitted to descend so as to cause the heads on the projection 38 to engage behind the lower narrow portions of the key-hole slots. The back support 35 rests upon the frame 16 of the rear stool 15, and engages the forward face of its rear fence 21.

A front seat cushion 40 and a rear seat cushion 41, both of the conventional design, are mounted upon the stools, being held against forward movement by the front fences 20 and acting to wedge the lower edges of the back supports 27 and 35 against the rear fences 21.

When the operator desires to employ the car for light hauling, the rear seat only is removed. No projections are left in the body upon which articles might catch and be injured. When the operator is touring or camping, both of the seats with their backs and stools are entirely removed from the body, leaving the same clear and unobstructed for use as a sleeping compartment. As will be apparent from Figs. VI and VII, the stools may be adjusted to any one of three different positions longitudinally of the car. The back support for the front seat may swing about the bolts 32 when loosened so as to permit the lower edge of the back support to follow the fence 21 and engage the same in each position. When the adjustment is made, the bolts 32 are tightened. All of the elements of the seat are then very rigidly held in position. In case the rear stool is mounted for longitudinal adjustment sufficient play may be left in the fastenings 36, 38 to permit the lower edge of the back support 35 to follow the rear fence 21 of the stool.

While I have shown and described in considerable detail, a specific embodiment of my invention, it is to be understood that this showing and description is illustrative only and for the purpose of rendering my invention clear, and that I do not regard the invention as limited to the details of construction illustrated or described, except in so far as I have included such limitations within the terms of the following claims, in which it is my intention to claim all novelty inherent in my invention, broadly as well as specifically.

I claim as my invention:

1. In a body for automotive vehicles comprising a floor and an encircling wall, a transversely arranged stool, means for attaching the stool to the floor in one of several positions of adjustment longitudinally of the body, a seat back, means for attaching said back to said wall, permitting movement of the back through a small arc, and interengaging means between said stool and the lower portion of said seat back.

2. In a body for automotive vehicles comprising a floor and an encircling wall, a transversely arranged stool, means for removably attaching the stool to the floor in one of several positions of adjustment longitudinally of the body, a seat back, means for removably attaching said back to said wall, permitting a swinging adjustment of the lower edge of the back through a small arc, and interengaging means between said stool and the lower portion of said seat back.

3. In a body for automotive vehicles comprising a floor and side walls, a transversely arranged stool, means for removably attaching the stool to the floor, a unitary back support comprising a rear section and side quarters, means connected with the side quarters for removably attaching the said back support to the side walls, and interengaging means between said stool and the bottom of said back support.

4. In a seating arrangement for automobile bodies, a removable seat comprising three separate removable units including a stool, a cushion detachably engaging the stool, and a seat back having its lower edge removably clamped between the cushion and a portion of the stool and provided with means adjacent its upper edge adapted to be detachably connected with the walls of the body.

5. In a seating arrangement for automobile bodies, front and rear stools including portions adapted to be removably connected with the body, a separate seat back unit for each of the stools, said stools and seat back units having interengaging portions serving to prevent displacement of the lower edges of the back units, and means adjacent the upper edges of said units adapted to be removably connected with the walls of the body, said stools and seat back units when removed, affording a clear space between the end walls of the body.

6. In a seating arrangement for automobile bodies, front and rear stools having portions adapted to be removably connected with the body, a separate seat back unit for each of the stools, said stools and seat back units having interengaging portions serving to prevent displacement of the lower extremities of the back units, means adjacent the upper edges of the back units adapted to be removably connected with the walls of the body, and detachable seat cushions upon the stools disposed in engagement with the bottom portions of the seat back units.

In testimony whereof, I affix my signature.

GEORGE E. GRIMM.